United States Patent
Yang

(10) Patent No.: US 9,985,285 B2
(45) Date of Patent: May 29, 2018

(54) ACTIVE MATERIAL

(71) Applicant: Prologium Holding Inc., Grand Cayman (KY)

(72) Inventor: Szu-Nan Yang, Taoyuan (TW)

(73) Assignee: PROLOGIUM HOLDING INC., Grand Cayman (KY)

( * ) Notice: Subject to any disclaimer, the term of this patent is extended or adjusted under 35 U.S.C. 154(b) by 0 days. days.

(21) Appl. No.: 15/674,725

(22) Filed: Aug. 11, 2017

(65) Prior Publication Data

US 2017/0346083 A1 Nov. 30, 2017

Related U.S. Application Data

(62) Division of application No. 14/797,300, filed on Jul. 13, 2015.

(30) Foreign Application Priority Data

Jul. 16, 2014 (TW) .............................. 103124345 A

(51) Int. Cl.
*H01M 4/04* (2006.01)
*H01M 4/134* (2010.01)
(Continued)

(52) U.S. Cl.
CPC ......... *H01M 4/366* (2013.01); *H01M 4/0461* (2013.01); *H01M 4/134* (2013.01);
(Continued)

(58) Field of Classification Search
CPC .. H01M 4/0461; H01M 4/134; H01M 4/1395; H01M 4/366; H01M 4/382;
(Continued)

(56) References Cited

U.S. PATENT DOCUMENTS 6,265,099 B1 * 7/2001 Gauthier .............. H01M 4/13
429/128
6,537,701 B1 3/2003 Nimon et al.
(Continued)

FOREIGN PATENT DOCUMENTS

CA 2861036 7/2013
CN 1624954 A 6/2005
(Continued)

OTHER PUBLICATIONS

Vijay A. Sethuraman et al : "Increased cycling efficiency and rate capability of copper-coated silicon anodes in lithium-ion batteries", Journal of Power Sources 196 (2011) 393-398.
(Continued)

*Primary Examiner* — Brittany Raymond
(74) *Attorney, Agent, or Firm* — Rabin & Berdo, P.C.

(57) ABSTRACT

An active material is disclosed in the present invention. The active material includes a lithium active material and a complex shell which completely covers the lithium active material. The complex shell includes at least one protection covering and at least one structural stress covering. The protection covering is a kind of metal which may alloy with the lithium ion. The structural stress covering dose not alloy with the lithium active material. The complex shell efficiently blocks the lithium active material out of the moisture and the oxygen so that the lithium active material is able to be stored and operated in the general surroundings. The structural stress provided via the structural stress covering may keep the configuration of the active material unbroken after the repeating reactions.

20 Claims, 3 Drawing Sheets

(51) Int. Cl.
*H01M 4/1395* (2010.01)
*H01M 4/36* (2006.01)
*H01M 4/62* (2006.01)
*H01M 10/052* (2010.01)
H01M 4/46 (2006.01)
H01M 4/38 (2006.01)

(52) U.S. Cl.
CPC ........... *H01M 4/1395* (2013.01); *H01M 4/62* (2013.01); *H01M 4/624* (2013.01); *H01M 10/052* (2013.01); *H01M 4/382* (2013.01); *H01M 4/463* (2013.01)

(58) Field of Classification Search
CPC ........ H01M 4/463; H01M 4/62; H01M 4/624; H01M 10/052
See application file for complete search history.

(56) References Cited

U.S. PATENT DOCUMENTS

| | | | |
|---|---|---|---|
| 7,534,530 B2 | 5/2009 | Guterman et al. | |
| 2002/0012846 A1* | 1/2002 | Skotheim | H01M 2/1673 429/231.95 |
| 2005/0118507 A1 | 6/2005 | Guterman et al. | |
| 2012/0202112 A1* | 8/2012 | Yushin | H01M 4/38 429/200 |
| 2013/0136990 A1 | 5/2013 | Li et al. | |
| 2014/0255780 A1* | 9/2014 | Mikhaylik | H01M 2/1626 429/213 |

FOREIGN PATENT DOCUMENTS

| | | |
|---|---|---|
| CN | 102244263 B | 9/2013 |
| JP | 2005-174924 | 6/2005 |
| JP | 2010-251339 A | 11/2010 |
| KR | 10-2005-0052920 A | 6/2005 |
| KR | 10-2014-0053875 | 5/2014 |
| TW | 201322535 A1 | 6/2013 |
| TW | 201414059 A1 | 4/2014 |
| WO | 2012/104805 A1 | 8/2012 |
| WO | 2013/009429 A1 | 1/2013 |
| WO | 2014/031929 A1 | 2/2014 |

OTHER PUBLICATIONS

Q Dong : "Preparation and performance of nickel-tin alloys used as anodes for lithium-ion battery" ; Solid State Ionics 167 (2004) 49-54.

* cited by examiner

ACTIVE MATERIAL

This application is a division of U.S. application Ser. No. 14/797,300, filed Jul. 13, 2015, which claims the benefit of priority based on Taiwan Patent Application No. 103124345, filed on Jul. 16, 2014, the contents of which are incorporated herein by reference in their entirety.

BACKGROUND

1. Technical Field

The present invention is related to an active material, in particular to an active material comprising the lithium metal.

2. Description of Related Art

In order to provide the power, the proper active materials must be applied for the power supply system to convert the chemical energy into the electrical energy. For example, the common active materials applied for the lithium battery contain the lithium, carbon and so on, wherein the lithium metal has the highest energy density. However, the lithium metal has high chemical activity so that the storage and operation conditions must be maintained severely since the lithium metal reacts with the oxygen and moisture in the surroundings immediately after contacting. The conditions of storage and operation must be controlled in low moisture, few oxygen and proper temperature and humidity so that the cost of process gets higher. Since, the lithium metal is so active, the excite oxidation-reduction reaction occurs under improper conditions, which sometimes would turn into the combustion reaction.

As known, in order to increase the reaction surface area of the electrode of the power supply system, the particle size of the lithium is in the scale of micrometer or nanometer. A lithium carbonate shell is exerted for covering the lithium metal in the scale of micrometer or nanometer for solving the difficulties in storing and operating. However, the smaller the particle is the severer reaction occurs. Hence, during the slurry mixing, the low-polarity solvent, such as toluene, is required to avoid the reaction between the lithium and the NMP/PVDF solvent. But the low-polarity solvent is harmful for the human and the environment.

Accordingly, an active material is provided to overcome the above problems.

SUMMARY OF THE INVENTION

It is an objective of this invention to provide an active material. A composite layer, which comprises at least a protection layer and at least a structural layer, covers the lithium active material entirely. The composite layer blocks the moisture and the oxygen from the surroundings so that the high reactive lithium active material can be stored and operated under the normal condition. The dependence of the storage and/or operation conditions of the active material having the lithium metal can be decreased.

It is an objective of this invention to provide an active material. The composite layer covering the lithium active material can provide higher ionic conductivity and structural strength so that the reacted protection layer can be confined to a certain area instead of being far away the lithium active material. The structure of the active material would not break down due to the loosen structure of the protection layer after the repeating alloying/de-alloying reaction.

It is an objective of this invention to provide an active material. The protection layer of the composite layer comprises a first protection material and second protection material. The first protection material and the second protection material can be alloyed metal and/or non-alloyed metal. The content of the metal that can alloy with the lithium metal and/or the lithium ion is not less than 0.1%.

It is an objective of this invention to provide an active material. The lithium active material and the protection layer are separated via the barrier layer, which is disposed between the lithium metal layer and the protection layer of the composite layer. No unexpected reactions, such as the alloy reaction, would occur in the contacting interface between the lithium active material and the protection layer before expected reactions start.

The present invention discloses an active material comprising a lithium active material and a composite layer covering the lithium active material entirely. The composite layer comprises at least a protection layer and at least a structural layer. The protection layer has at least a metal which is able to alloy with the lithium; the structural layer, on the other hand, does not alloy with the lithium metal and/or the lithium ion. The composite layer effectively blocks the lithium active material from the surroundings so that the moisture and the oxygen would not contact with the lithium active material. The active material having the composite layer disclosed in the present invention can be stored and operated under normal condition. The structural stress of the structural layer can provide a buffer for sustaining the loosen structure of the protection layer after the alloy reaction and avoid the structure breakdown.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION

The present invention discloses an active material applied in the power supply system having dissociated ions such as lithium battery. The active material comprises a lithium active material entirely covered via a composite layer comprising at least a protection layer and at least a structural layer. The composite layer effectively blocks the moisture and the oxygen from the lithium active material via the proper materials and the relative locations of the protection layer and the structural layer. The active material of the present invention can be stored and operated under normal condition. Besides, the loosen protection layer, after repeating reactions, could be confined to the composite layer instead of being far away from the lithium active material so that the reversible efficiency of the protection layer can be increased and the great amount of the structure breakdown of the active material of the electrode would be avoided.

The protection layer and the structural layer are described hereinafter.

The protection layer must have at least a metal which is able to alloy with the lithium active material and/or the dissociated ions (ex. lithium ions). The structure of the protection layer becomes loosen after alloying reaction, wherein the loosen structure provides paths for the dissociated ions and the lithium active material to proceed the electrical-chemical reaction. The protection layer blocks the moisture and the oxygen in the surroundings from the lithium active material before the active material is assembled into the power supply system. Accordingly, the moisture and oxygen in the surroundings would not contact with the lithium active material so that no severe oxidation-reduction reaction occurs due to the protection layer.

The structural layer must have a higher structural strength to sustain the structure deformations (ex. loosen lattice due to alloying reaction) of the protection layer and/or the lithium active material. Also, the structural layer can serve as the concluding points of the adhesion of the active material so that the deformation of the active material would not lead to the structure breakdown of the electrode. The structural layer has some ionic conductive regions for ions to migrate into the protection layer to proceed the oxidation-reduction reaction. Further, the structural layer has the ability of electrical conducting so that the inner resistance of the active material can be reduced.

Accordingly, the present invention is disclosed in detail.

Figure 1A:
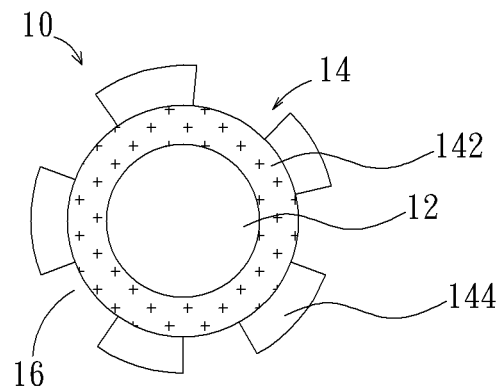
FIG. 1A illustrates the active material of this present invention.

Referring to the FIG. 1A, an embodiment of the active material of the present invention has been illustrated.

As illustrated, the active material 10 comprises a lithium active material 12, a composite layer 14 covering the lithium active material 12 entirely. The composite layer 14 comprises a protection layer 142 and a structural layer 144.

The protection layer 142 is disposed next to the outer surface of the lithium active material 12 and entirely covers the lithium active material 12. Accordingly, the lithium active material 12 is completely isolated from the moisture and the oxygen of the surroundings so that the severe oxidation-reduction reaction can be avoided.

The structural layer 144 at least partially covers the outer surface of the protection layer 142. The alloyed protection layer 142 and the lithium active material 12 are confined to a certain area due to the structural layer 144. Moreover, the structural layer 144 covers on the outer surface of the lithium active material 12 so that the structural layer 144 can increase the structural strength, especially when the structure of the alloyed protection layer 142 becomes loosen, and can confined the alloyed materials closer to the un-reacted protection layer 142. Once, the de-alloying reaction occurs, the loosen alloyed materials would not be far away from the protection layer 142, hence, the alloyed materials may proceed the alloying reaction in the region closer to the lithium active material 12 and the un-reacted protection layer 142 so that the alloyed materials can be reacted under the proper operation voltage. Besides, due to the function of confining the alloyed materials, the electrical conductivity and the ionic conductivity of the active material 10 can both be remained via the structural layer 144 even after several times of the alloying/de-alloying reactions.

The lithium active material 12 is made of a material selected from the group consisting of the lithium metal, the lithium compound or the combination thereof. The lithium active material 12 can be in the shape of granule, sheet and/or any shapes. The protection layer 142 comprises at least a metal. And, of course, a plurality of metals can be included as well. The dissociated ions can be the lithium ions for the case of the lithium battery. Accordingly, the metal of the protection layer 142 can be selected from the group consisting of aluminum, tin, alloyed aluminum, alloyed tin and/or a lithium-alloyable metal/alloy. The dissociated ions can be provided via the medium such as the conventional electrolyte exerted in the power supply system. For example, the medium can be selected from the group consisting of liquid-phase electrolyte, solid-phase electrolyte, gel electrolyte, liquid ion, organic solvent with lithium salt, inorganic solvent with lithium salt or a combination thereof.

A lithium battery is taken as an example for the power supply system hereinafter. The protection layer 142 of the active material 10 is alloyed with the lithium ions (i.e. dissociated ions) provided via the electrolyte (i.e. the medium) of the lithium battery and/or is alloyed with the lithium metal formed on the surface of the protection layer 142 via lithium ion reduction. The alloyed materials have loosen and swelled lattices so that the protection layer 142 of the active material 10 gradually breaks down. However, based on the main function of the protection layer 142, it is clear to realize that the protection layer 142 is exerted to protect the lithium active material 12 from the moisture and the oxygen of the surroundings before the active material 10 is sealed inside the lithium battery. Once the active material 10 is sealed inside the lithium battery, the lithium active material 12 can only contact with fewer moisture and oxygen, so even the protection layer 142 swells and/or breaks down due to alloying/de-alloying reactions, the protection provides via the protection layer 142 to the lithium active material 12 is not be affected substantially.

However, as for the conventional active material, the breakdown of the protection layer still does have some influences of the performance of the active material. It is because that the conventional active material is not covered via the structural layer on the outer surface such that the alloyed materials cannot be confined to a certain area and would be distributed over the electrolyte and/or be formed as the loosen materials. Once, the more alloyed materials are formed, the poorer electrical conductivity and ionic conductivity are gained. The activity of the active material is decreased and the polarity issue becomes more severely. In other words, the alloyed protection layer decreases the degree of alloying reaction (i.e. decreases the rate of the oxidation-reduction reaction) and it makes the reversible capacity of the lithium battery decrease after several times of the alloying/de-alloying reactions. Comparing to the present invention, the conventional active material is covered via the protection layer only. Since the conventional protection layer serves as the concluding points of the active material and the electrode, the protection layer starts to swell and break down from its outer surface after several times of the alloying/de-alloying reactions. Apparently, the concluding points of the adhesion provide via the protection layer break down as well. At last, the active material would be peeled from the electrode and this would affect the performances of the lithium battery. The active material 10 disclosed in the present invention is covered via the structural layer 144 on the outer surface so that the alloyed protection layer 142 can be confined to a certain area. Hence, the concluding points provided via the protection layer 142 would not break down so that the active material 10 can adhere to the electrode tightly even after several times of the alloying/de-alloying reactions.

Unlike the conventional active material, the structural layer 144 serves as the concluding points in the present invention. Meanwhile, the structural layer 144 provides the structural strength (i.e. structure stress) of the active material 10 to maintain the shape and the structure. The alloyed protection layer 142 can be confined via the structural layer 144, which at least partially contacts with the protection layer 142, after several times of the alloying/de-alloying reactions. In this embodiment, the structural layer 144 partially covers the protection layer 142 and covers the lithium active material 12 indirectly. In other words, instead of covering protection layer 142 entirely, the structural layer 144 can partially covers the protection layer 142 as long as the structure stress provided is high enough.

In this embodiment, the structural layer 144 can be a metal having high structure stress and high electrical conductivity, for example, the structural layer 144 can be made of copper. In order to provide the ionic conductivity, the copper structural layer 144 does not cover the protection layer 142 entirely and has some holes 16 and/or gaps to serve as the ion/electron paths for oxidation-reduction reactions, that is, to serve as the ionic conductive area. The protection layer 142 is exposed from the holes 16 and/or the gaps so that the dissociated ions can contact with the protection layer 142 directly and alloys with the protection layer 142 to form the loosen alloyed materials to expose the lithium active material 12 for the oxidation-reduction reactions.

Figure 1B:
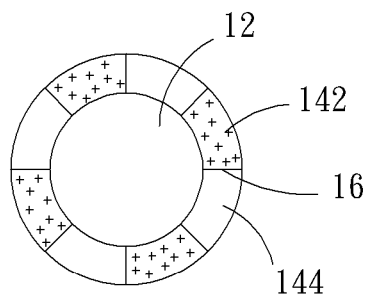
FIG. 1B illustrates the active material of this present invention.

Referring to the FIG. 1B, an active material of the resent invention is illustrated. The composite layer 14 is comprises a protection layer 142 and a structural layer 144, which are interlaced. The configuration is based on the structural layer 144 made of the material having no moisture and no oxygen, such as copper, so that the structural layer 144 can serve as a part of protection layer 142 before the lithium active material 12 is sealed inside the battery. The ionic conductivity of the structural layer 144 of this embodiment can be provided via the adjacent protection layer 142.

Figure 1C:
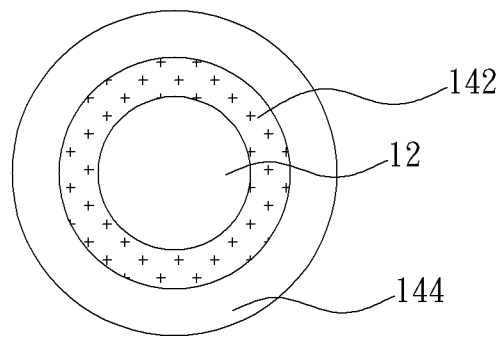
FIG. 1C illustrates the active material of this present invention.

Referring to the FIG. 1C, an active material of the present invention is illustrated. The main difference between the embodiments of FIG. 1A and FIG. 1C is that the structural layer 144 is made of a porous material, that is, the structural layer 144 itself is a porous structure. For example, the proper materials can be selected from the group consisting of polymer, ceramic, fiber or a combination thereof. Except for having the ionic conductivity, the intrinsic property of the structural layer 144 can be electrical conductive. In order to having the electrical conductive property, the structural layer 144 can be made of a electrical conductive material or be made of an insulation material comprising some electrical conductive materials such as carbon particles, metal powders and so on. Moreover, the solid electrolyte and/or the gel electrolyte can be filled into the holes of the structural layer 144 or can be absorbed via the polymer structural layer 144 via immerging.

The protection layer 142 of the active material 10 of the present invention comprises a first protection material and a second protection material, wherein the first protection material of the protection layer 142 is able to alloy with the lithium metal and/or the lithium ions and the second protection material of the protection layer 142 is not able to alloy with the lithium metal and/or the lithium ions. The first protection material and the second protection material can be the metal, metalloid and/or alloy. The content of the first protection material is not less than 0.1%, that is, the content of the material, which can alloy with the lithium metal and/or the lithium ions, is not less than 0.1%.

The first protection material can be selected from aluminum, tin, silicon, alloyed aluminum, alloyed tin, alloyed silicon or other metal, metalloid and/or alloy materials. The second protection material comprises one kind of metal/metalloid/alloy material or more than one kinds of metal/metalloid/alloy materials such as copper, nickel, iron or the combination thereof. The protection layer 142 can be a dual-alloy material, a triple-alloy material or a multi-alloy material. For example, tin is selected as the material which can alloy with the lithium metal and/or the lithium ions and nickel-tin alloy is selected as the material which cannot alloy with the lithium metal and/or the lithium ions, wherein the content of tin is not less than 0.1%.

The protection layer 142 swells after alloying. The swelling degree can be decreased via the addition of the second protection material because the second protection material cannot alloy with the lithium metal and/or the lithium ions, that is, the swelling volume mainly comes from the alloyed first protection material. The metal which cannot alloy with the lithium metal and/or the lithium ions can effectively solve the swelling problem after alloying reaction and avoid the decrease of reversible capacity.

Figure 2A:
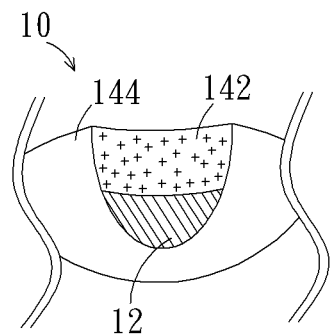
FIG. 2A illustrates the active material of this present invention.
Figure 2B:
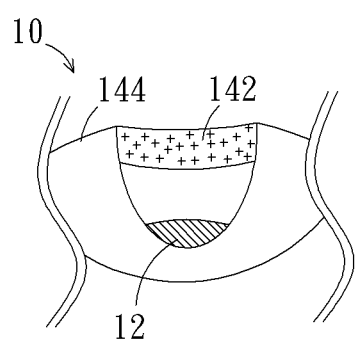
FIG. 2B illustrates the active material of this present invention.

Please refer to the FIGS. 2A and 2B, two embodiments of the active material of the present invention are illustrated. In FIG. 2A, the structural layer 144 of the active material 10 comprises a plurality of blind holes. Inside the blind holes, the lithium active material 12 is disposed in the bottom of the holes and the protection layer 142 is disposed above the lithium active material 12. In FIG. 2B, the lithium active material 12 and the protection layer 142 inside the blind holes of the structural layer 144 do not contact with each other. The blind holes of the structural layer 144 can be taken place via the through holes.

Figure 3A:
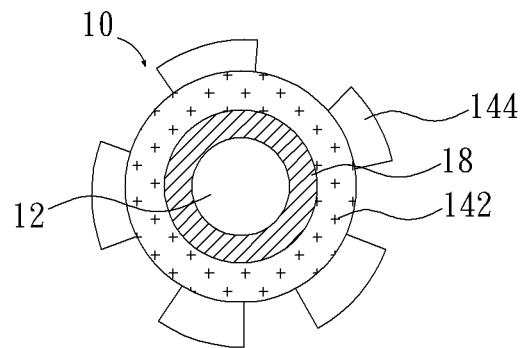
FIG. 3A illustrates the active material of this present invention.
Figure 3B:
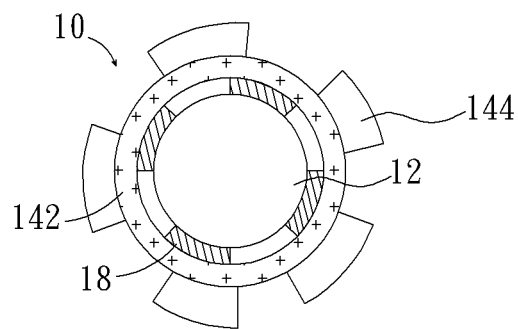
FIG. 3B illustrates the active material of this present invention.
Figure 3C:
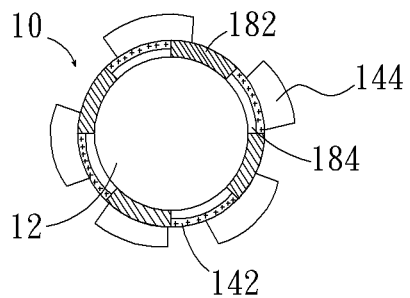
FIG. 3C illustrates the active material of this present invention.

The FIGS. 3A to 3C illustrate the active material 10 comprising a barrier layer 18. The barrier layer 18 separates the lithium active material 12 and the composite layer so that the barrier layer 18 cannot react with the lithium and has the ability of electrical conductivity and ionic conductivity. The ability of electrical conductivity of the barrier layer 18 can allow the electrons to get into the lithium active material 12 for proceeding the oxidation-reduction reactions. The ability of ionic conductivity of the barrier layer 18 can be provided via the material exerted. Or the ions can reach to the lithium active material 12 via the alloyed materials of the protection layer 142 to lead the medium toward the barrier layer 18 and at last the potential of the whole active material 10 is the same as the potential of the lithium active material 12.

The barrier layer 18 is disposed next to the lithium active material 12 or covers the outer surface of the lithium active material 12. The protection layer 142 is disposed next to the lithium active material 12 or covers the outer surface of the lithium active material 12. In FIG. 3A, the barrier layer 18 directly and entirely covers the outer surface of the lithium active material 12. In FIG. 3B, the barrier layer 18 directly and partially covers the outer surface of the lithium active material 12. In FIG. 3C, the barrier layer 18 further comprises at least an inert metal region 182 and at least a depletion region 184. The inert metal region 182 is disposed on the outer surface of the lithium active material 12 and is lithium-unalloyable. The depletion region 184 is adjacent to the inert metal region 182 and disposed between the composite layer and the lithium active material 12. No matter what kind of embodiment, the lithium active material 12 and the protection layer 142 of the composite layer are separated via the barrier layer 18 so that the lithium active material 12 would not react with the protection layer 142 under the improper condition (ex. elevated temperature) before the Faraday reaction occurs to keep the protection layer 142 unreacted.

In FIG. 3C, the inert metal region 182 is made of metal which is selected from the group consisting of copper, nickel, iron, titanium, zinc, silver, gold, alloyed copper, alloyed nickel, alloyed iron or a combination thereof. The depletion region 184 is an empty space. When the protection layer 142 and the lithium ions from the medium react to form the alloy materials, the depletion region 184 can provide a buffer for the swelling volume and provide the ionic paths as well.

The ability of electrical conductivity of the barrier layer 18 is helpful for the keeping the potential of the active material 10 almost equal to the potential of the anode system (i.e. anode electrode, not shown). Consequently, when the active material 10 is entirely sealed inside the power supply system and is provided a medium such as injecting a liquid electrolyte, the active material 10 gradually absorbs the medium. At this moment, the lithium active material 12 is ionically conductive so that the potential of the active material 10 is almost equal to the potential of the lithium active material 12. The lithium ions from the liquid electrolyte deposit uniformly and delicately on the surface of the protection layer 142 and further alloy with the protection layer 142 of the composite layer to form the small-article alloyed materials. When the alloyed protection layer 142 breaks into small particles, the electrical conductive paths are formed and the barrier layer 18 becomes the ionic conductive paths due to the liquid electrolyte immerged (i.e. ions leading-in).

As for the properties of the material, the barrier layer 18 can be made of an electrical/ionic conductive material in the shape of layer structure. The material can be the electrical conductive polymer such as PA or any electrical/ionic conductive polymer. The barrier layer 18 can be made of the porous electrical conductive material such as the insulation polymer having the electrical conductive particles, wherein the electrical conductive particles can be selected from the metal particles or the non-metal particles. The ions for the lithium active material 12 can be provided via the electrical conductive material through the protection layer 142. The holes or the depletion regions 184 as illustrated in FIG. 3C of the barrier layer 18 can serve as the ionic paths.

The reaction mechanism of the active material of the present invention as illustrated in FIG. 1A is provided hereinafter.

At first, provide a medium to the active material 10 of the power supply system, for example, the medium could be a liquid electrolyte or a liquid ion. The step is to inject the electrolyte into the power supply system to make the active material 10 immerge in the electrolyte. At this moment, the electrolyte penetrates through the holes 16 of the structural layer 144 and reaches to the surface of the protection layer 142.

Then, charge the power supply system (i.e. the lithium battery) to make the dissociated ions (i.e. the lithium ions) of the medium (i.e. the electrolyte) alloy with the metal material of the protection layer 142 so that the alloyed protection layer 142 gains ions.

For example, the lithium active material 12 is the lithium metal and the material of the protection layer 142 reacting with the lithium active material 12 is the aluminum metal. As charging the lithium battery, because the surface of the protection layer 142 would be wetted via the electrolyte, as long as the potential reaches the lithium deposition potential, the lithium ions deposit on the surface of the aluminum metal of the protection layer 142 and alloy with the aluminum to form the Li—Al alloy. The lattices of the Li—Al alloys are broken and loosen. The structural layer 144 covering the protection layer 142 and adhering to the electrode material can confine the Li—Al alloys in a certain area instead of randomly dispersing in the electrolyte. Hence, the distribution of the lithium active material 12 in the electrode will not break down due to the alloyed protection layer 142.

Moreover, the loosen protection layer 142 further provides the ionic paths for the lithium ions of the electrolyte to migrate into the lithium active material so that the potentials of both the active material 10 and the lithium active material 12 are the same. Apparently, no influence affects the follow-up oxidation-reduction reactions. Later, the lithium active material 12 serves as the conventional electrode of the lithium battery, which is able to receive and release the ions and electrons, so that the other procedures are similar to the conventional charge/discharge procedures.

Accordingly, the active material disclosed in the present invention can be stored and operated under normal condition because the highly reactive lithium active material is covered via the composite layer comprising the protection layer and the structural layer. The cost for storage and operation can be greatly decreased. Also, the operation becomes more flexible and easier.

Besides, the structural layer disclosed in the present invention can confined the alloyed materials formed from the protection layer in a certain area so that the alloyed materials remain close to the lithium active material during the follow-up charging and discharging procedures. The efficiency of the active material would not be decreased due to the structure breakdown of the active material. Meanwhile, the stable and great concluding force between the structural layer and the electrode can also keep the distribution of the active material inside the electrode even the structure of the protection layer breaks.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active material, adapted to a power supply element, comprising:
   a lithium active material; and
   a composite layer that entirely covers the lithium active material to block moisture and oxygen from the lithium active material, and that comprises:
   a structural layer that partially covers an outer surface of the lithium active material, that is in direct contact with the lithium active material, and that is comprised of a material which does not alloy with lithium metal/ion and which does not have ionic conductivity; and a protection layer that partially covers the outer surface of the lithium active material, that comprises a first protection material, and that forms an alloy with lithium metal/ion, wherein the protection layer and the structural layer are interlaced on the outer surface of the lithium active material, and a part of the protection layer is exposed from the structural layer, and wherein the protection layer becomes loosened after an alloying reaction to provide paths for the lithium active material to proceed with an electrical-chemical reaction.

2. The active material of claim 1, wherein the structural layer further comprises a plurality of blind holes and the lithium active material is disposed in the blind holes.

3. The active material of claim 1, wherein the structural layer is made of metal selected from the group consisting of copper, nickel, iron, alloyed copper, alloyed nickel, alloyed iron, and a combination thereof.

4. The active material of claim 1, wherein the lithium active material is made of a material selected from the group consisting of lithium metal, a lithium compound, and a combination thereof.

5. The active material of claim 1, wherein the first protection material of the protection layer comprises at least one of a metal and a metalloid.

6. The active material of claim 5, wherein the at least one of a metal and a metalloid is selected from the group consisting of aluminum, tin, silicon, alloyed aluminum, alloyed tin, alloyed silicon, and a lithium-alloyable material.

7. The active material of claim 1, wherein the protection layer further comprises a second protection material, wherein at least one of the first protection material and the second protection material are at least one of alloyed materials and non-alloyed materials, and wherein the first protection material has a content in the protection layer that is not less than 0.1%, and the second protection material is lithium-unalloyable.

8. The active material of claim 1, further comprising a medium to proceed with an oxidation-reduction reaction and to donate lithium ions for at least parts of the protection layer to be alloyed.

9. The active material of claim 8, wherein the medium is made of a material selected from the group consisting of a liquid-phase electrolyte, a solid-phase electrolyte, a gel electrolyte, a liquid ion, an organic solvent with a lithium salt, an inorganic solvent with a lithium salt, and a combination thereof.

10. The active material of claim 1, wherein the structural layer is electrically conductive.

11. The active material of claim 1, further comprising a barrier layer that separates the lithium active material and the composite layer, and that is lithium-unalloyable.

12. The active material of claim 11, wherein the barrier layer is electrically conductive.

13. The active material of claim 11, wherein the barrier layer is ionically conductive.

14. The active material of claim 11, wherein the barrier layer is disposed next to the outer surface of the lithium active material.

15. The active material of claim 11, wherein the composite layer covers the outer surface of the barrier layer.

16. The active material of claim 11, wherein the barrier layer is at least one of a conductive polymer and a porous conductive layer.

17. The active material of claim 16, wherein the porous conductive layer is a polymer including at least one of conductive particles and a metal grid.

18. The active material of claim 11, wherein the barrier layer comprises:
at least an inert metal region, disposed on the outer surface of the lithium active material and lithium-unalloyable; and
at least a depletion region, adjacent to the inert metal region and disposed between the composite layer and the lithium active material.

19. The active material of claim 18, wherein the inert metal region is made of metal selected from the group consisting of copper, nickel, iron, titanium, zinc, silver, gold, alloyed copper, alloyed nickel, alloyed iron, and a combination thereof.

20. The active material of claim 18, wherein the depletion region is an empty space.

* * * * *